United States Patent [19]

Wald

[11] 4,262,043
[45] Apr. 14, 1981

[54] PROCESS FOR APPLYING COATING COMPOSITION COMPRISING A POLYSILOXANE RESIN-FORMING PRECONDENSATE, AN EPOXY RESIN, A SILICONE FLUID, AND A CATALYST

[75] Inventor: David K. Wald, Cherry Hill, N.J.

[73] Assignee: E. I. Du Pont de Nemours and Company, Wilmington, Del.

[21] Appl. No.: 16,307

[22] Filed: Feb. 28, 1979

Related U.S. Application Data

[60] Division of Ser. No. 871,697, Jan. 23, 1978, abandoned, which is a continuation-in-part of Ser. No. 664,232, Mar. 5, 1976, abandoned.

[51] Int. Cl.³ .................. B05D 3/02; C08L 91/00; C08L 83/12
[52] U.S. Cl. .................. 427/387; 260/29.15 B; 260/29.1 R
[58] Field of Search .................. 427/387

[56] References Cited

U.S. PATENT DOCUMENTS

| | | | |
|---|---|---|---|
| 2,494,920 | 1/1950 | Warrick | 427/387 |
| 3,170,962 | 2/1965 | Tyler | 260/824 EP |
| 3,202,542 | 8/1965 | Poje | 427/387 |
| 3,801,522 | 4/1974 | Vasta | 260/29.1 R |
| 3,925,276 | 12/1975 | Morrill | 260/31.2 R |
| 4,180,613 | 12/1979 | Vassiliov | 427/387 |

Primary Examiner—Joseph L. Schofer
Assistant Examiner—Peter F. Kulkosky

[57] ABSTRACT

A coating composition comprising
  (a) a binder containing a polysiloxane resin-forming precondensate and an epoxy resin,
  (b) a dimethylpolysiloxane fluid,
  (c) a metal salt catalyst, and
  (d) an inert liquid carrier.

The composition forms finishes that have thermal stability, release properties, hardness glossy appearance, and abrasion resistance and are used as finishes for cooking vessels.

3 Claims, No Drawings

PROCESS FOR APPLYING COATING COMPOSITION COMPRISING A POLYSILOXANE RESIN-FORMING PRECONDENSATE, AN EPOXY RESIN, A SILICONE FLUID, AND A CATALYST

CROSS-REFERENCE TO RELATED APPLICATION

This is a division, of application Ser. No. 871,697, filed Jan. 23, 1978 now abandoned, and which is a continuation-in-part of copending application Ser. No. 664,232, filed Mar. 5, 1976 now abandoned, and assigned to the assignee of the present application.

BACKGROUND OF THE INVENTION

1. Field of the Invention

This invention relates to a coating composition that is useful as a release finish for cooking vessels because of its thermal stability, release properties, hardness, glossy appearance and abrasion resistance. Particularly, this invention relates to a coating composition useful for coating tin-plated steel cooking vessels because it is curable at a temperature which is lower than the melting point of tin, about 232° C.

2. Prior Art

Cookware and bakeware items have been coated with fluorocarbon polymers, such as polytetrafluoroethylene and copolymers thereof. Finishes of polytetrafluoroethylene have excellent thermal stability and good release properties and have been widely used and well accepted. However, a primer is generally required for these coatings, along with special treatment of the metal substrate, to obtain excellent adhesion of the coating. Additionally, since the temperature needed to fuse the fluorocarbon polymer is higher than the melting point of tin, it cannot be used upon tin-plated metals. Therefore, it would be desirable to have a coating composition that could be applied to unprimed metal substrates, including tin, and would form a finish that has release properties and also good abrasion and scratch resistance.

The novel coating composition of this invention can be applied directly to metal without the use of a primer, forms a finish that has release properties, outstanding adhesion to unprimed metal, thermal stability, good hardness, abrasion resistance, and glossy appearance and is an ideal coating composition for cooking vessels, particularly tin-plated ones.

SUMMARY OF THE INVENTION

The coating composition has a solids content of 25-80% by weight in an inert liquid carrier and is comprised of (a) a binder comprised of
(1) 60-99%, based on the weight of the binder, of a polysiloxane resin-forming precondensate which has one or more of the units

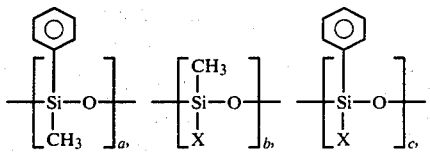

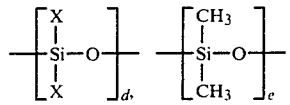

wherein
X is a functional group which allows cross-linking at its site, and
a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3,
and which has a silanol content above 4%, based on the weight of the precondensate;

(2) 1-40% based on the weight of the binder, of an epoxy resin having the formula:

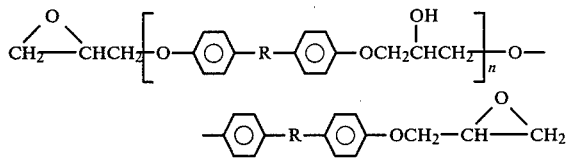

wherein
n is an integer from 0-42, and
R is an alkylene group of 1-4 carbon atoms;

(b) 0.2-10%, based on the weight of the binder, of silicone fluid which is a dimethyl polysiloxane fluid having a viscosity of 50-5000 centistokes measured at 25° C.;

(c) 0.2-10%, based on the weight of the binder, of catalyst which is a metal salt; and (d) inert liquid carrier.

Preferably, the precondensate, when measured at 60% resin solids in xylene at 25° C., has a viscosity of 30-50 centipoises, specific gravity of 1.03-1.2, and refractive index of 1.45-1.57. Precondensates having a random arrangement of the repeating units are, of course, included. (Percentages and proportions herein are by weight except where indicated otherwise.)

A metal cooking vessel coated with a cured film produced by the above composition is also part of the invention.

DESCRIPTION OF THE INVENTION

The coating composition of this invention preferably has a relatively high solids content of about 30-70%, more preferably 38-50%, in a suitable liquid carrier. The film-forming binder constituents are dissolved in organic solvents such as toluene, xylene, tetrahydrofuran, butyl carbitol, ethylene glycol monoethyl ether, ethylene glycol monobutyl ether, and the like.

The binder of the novel coating composition of this invention is a blend of polysiloxane resin-forming precondensate and an epoxy resin. The binder contains about 60-99% of silicone resin and 1-40% epoxy resin in the amounts necessary to equal 100%. Preferably, the binder contains 90-99% of silicone resin and 1-10% of epoxy resin.

Also present in the composition is a silicone fluid which is a dimethyl polysiloxane. The amount of dimethyl polysiloxane fluid utilized is based on the total weight of binder. The amount of fluid will range from 0.2–10%, based on the weight of the binder; preferably, the range will be 1–3%.

A catalyst is added to the composition to ensure good film formation and rapid cure. The amount of catalyst utilized is also based on the total weight of binder. It will range from 0.2–10%, based on the weight of the binder; preferably, the amount will be 0.4–1.2%.

The combination of these components provides a coating composition that has excellent adhesion to unprimed metal substrates in combination with good release properties, excellent thermal stability, and low temperature cure.

A particularly preferred methyl phenyl siloxane resin, when measured at 60% solids in xylene at 25° C., has a viscosity of about 35–45 centipoises, specific gravity of about 1.05–1.12, and a refractive index of about 1.50–1.53; it also has a softening point of about 75°–85° C.

Polysiloxane resins and resin-forming precondensates of the invention can be prepared by techniques known in the art. Generally, desired proportions of dimethyldichlorosilane, methylphenyldichlorosilane, and sometimes diphenyldichlorosilane are hydrolized to form cyclic structures, and then the cyclic structures are polymerized with acid or base to form the polysiloxane resin-forming precondensate. It is evident that appropriate proportions of the units selected for the structural formula must be provided in order to achieve the ratios of the preferred compositions and in order to obtain the desired resin-forming precondensates. For instance, those skilled in the art would know that if a, b, c, and e are each zero and the structure is made entirely of $$\left[\begin{array}{c} X \\ | \\ Si-O \\ | \\ X \end{array}\right]_d ,$$

the resulting composition would be hydrated silicon dioxide which is not a resin-forming precondensate. Also, if b, c and d were all zero and the resin were made entirely of

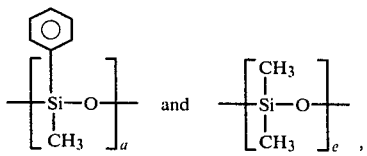

the result would be an elastomer rather than a resin.

The epoxy resins utilized in the present invention are commonly known in the art. One class of such resins has the generalized formula

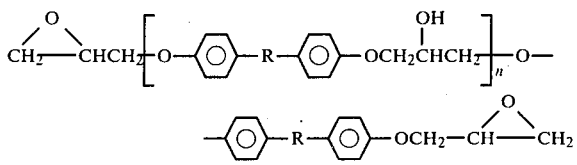

wherein
n is an integer from 0–42, and
R is an alkylene group of 1–4 carbon atoms.

The epoxy resins utilized in the present invention contain at least two epoxy groups per molecule and therefore, upon curing of the composition, introduce no uncross-linkable extractable portions into the coating.

Preferably, to obtain a coating with high gloss, a liquid epoxy resin is used. An undiluted liquid epoxy resin where the averae value of n is about 0–3, R is isopropylidene, the viscosity is 1.2–225 poises at 25° C. as measured by ASTM-D-445, and the epoxy equivalent about 150–470 is preferred. The epoxy equivalent is defined as the grams of resin containing one gram-equivalent of epoxide functionality as measured by ASTM-D-1652. A coating composition containing "Epon 828" is particularly preferred because finishes produced by such compositions have high gloss while maintaining high adhesion. "Epon 828" is a liquid epoxy resin where the average value of n is about 0, R is isopropylidene, the viscosity of the undiluted resin is 100–160 poises at 25° C. as measured by ASTM-D-445, and the epoxy equivalent is 185–192.

Modifications of epoxy resins can also be utilized in the coating composition of the present invention. For example, it is known to those skilled in the art that when an epoxy compound containing a hydroxy group is brought in contact with an acid, there results an ester or mixture of esters. Thus, when phosphoric acid is added to an epoxy resin, a reaction occurs at one or more of the epoxy groups of the molecule and the resulting mixture contains both the mono- and diesters of phosphoric acid. A product of this reaction is exemplified by the formula

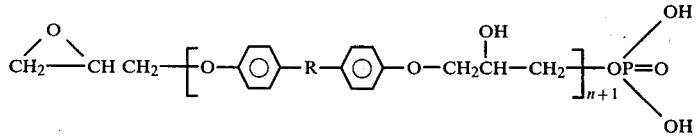

These modified epoxy resins can still function as epoxy resins in the coating compositions of the invention.

The dimethyl polysiloxane fluid utilized in the coating composition of this invention can have a viscosity of 0.65 to over a million centistokes measured at 25° C., but preferably has a viscosity of 100–5000 centistokes. To form particularly high quality compositions, a viscosity of 500–1500 centistokes is preferred. The dimethyl polysiloxane fluid is used to increase the release characteristic of the film produced.

Catalysts useful in the coating composition of this invention are metal salts, particularly metal salts of fatty acids such as zinc octoate and cobalt naphthenate. A preferred zinc octoate is Nuodex ® (a zinc octoate solution having an 8% zinc metal content sold by Tenneco). A coupling solvent, such as V.M. and P. Naptha, is sometimes used to ensure solubility of the catalyst within the coating composition.

Suitable liquid carriers include such organic solvents as those used for dissolving the film-forming binder constituents, for example, toluene, xylene, tetrahydrofuran, butyl carbitol, ethylene glycol monoethyl ether, ethylene glycol monobutyl ether, and the like.

Optionally, pigments can be used in the coating composition of the invention. A ratio of pigment to binder of about 1/100-400/100 can be utilized, preferably, about 1/100-200/100, more preferably, in compositions having excellent properties, about 1/100-50/100. Typical pigments that can be used are, for example, carbon black, titanium dioxide, brown, black, and yellow iron oxides, aluminum silicate, mica, talc, china clay, metal powders, carbonates, and the like.

Optionally, to provide the composition with increased scratch resistance, abrasion resistance, hardness, blister resistance, and decreasing porosity, finely divided inorganic hardening agent may be added in a ratio of hardening agent to binder of about 5/100 to about 400/100. The hardening agents that can be used include zirconium silicate, zirconium oxide, silicon dioxide, reactive and unreactive aluminas, and filler pigments such as aluminum flake, potassium titanate fibrils, titanium dioxide fibrils, silicone dioxide fibrils, and alumina monohydrate fibrils. Examples of aluminas which can be used are calcined aluminas, low-soda aluminas, reactive aluminas, high-purity aluminas, tabular aluminas, calcium aluminate cement, and hydrated alumina. The preferred hardening agents are reactive alumina. A preferred reactive alumina which is useful as a coating composition having excellent properties is "Reactive Alumina A-15SG" which is sold by Alcoa. This alumina consists of

| | |
|---|---|
| $Al_2O_3$ | 99.5 + % |
| $Na_2O$ | .08 |
| $SiO_2$ | .07 |
| $Fe_2O_3$ | .01 |

It, with compaction and sintering aids, can provide an all-alumina composition with a green body density of 2.86 gm/cc at 5000 psi, and fired density of 3.93 gm/cc, with only 10.1 percent linear shrinkage after one hour at 1665° C.

When a reactive alumina is used as the hardening agent, its ratio to binder is about 10/100 to about 70/100; preferably 20/100 to 40/100.

The coating composition of this invention can be prepared by many methods known to the artisan. One method is to first prepare a mill base by mixing pigment, silicone fluid, solvent, and silicone resin and then grinding the mixture by conventional techniques such as pebble mill grinding, ball mill grinding, sand mill grinding and the like. To the mill base is added more silicone resin and solvent, epoxy, catalysts and other constituents; this is blended to form the coating composition.

The composition of this invention is applied to the interior of a vessel by first roughening the interior surface of the vessel, preferably by grit blasting the surface with grit, or the surface can be roughened by other techniques. The surface is then cleaned.

The coating composition of this invention is then applied by conventional techniques, such as, spraying, electrostatic spraying, roller coating, and the like to the surface of the vessel to a thickness of 0.2-0.5 mil (5-125 μm) (dry), preferably 0.5-1.5 mil (12.5-37.5 μm) (dry) and is then baked for about 5-45 minutes at about 175°-400° C.

The coating composition of this invention forms excellent finishes, not only on cooking vessels, but also on ice cube trays, dough cutters, paper cutters, and can be used as a lubricant coating on bearing and curtain rods and can be used as a coating on coin machine slots, fan vents, shovels, and discardable aluminum utensils.

The following example illustrates the invention. All quantities are on a weight basis unless otherwise indicated.

EXAMPLE 1

A coating composition was prepared as follows:

| (a) (1) Preparing a resin solution by mixing until dissolved: | |
|---|---|
| | Parts by Weight |
| Silicone resin flake which is a heat curable structured methyl phenyl polysiloxane resin having the repeating structural formula | |

$$-O-\left[\begin{matrix}\phantom{O}\\ Si-O\\ \phantom{O}\end{matrix}\begin{matrix}C_6H_5\\ |\\ |\\ CH_3\end{matrix}\right]_{a},\left[\begin{matrix}CH_3\\ |\\ Si-O\\ |\\ X\end{matrix}\right]_{b},\left[\begin{matrix}C_6H_5\\ |\\ Si-O\\ |\\ X\end{matrix}\right]_{c},\left[\begin{matrix}X\\ |\\ Si-O\\ |\\ X\end{matrix}\right]_{d}$$

| | |
|---|---|
| wherein x is a functional group which allows cross-linking at its site, and a, b, c, and d are positive integers which are sufficiently large to provide the resin, when measured at 60% resin solids in xylene at 25° C., with a viscosity of 40 centipoises, specific gravity of 1.08, and refractive index of 1.518, and having a silanol content above 5% based on the weight of the resin. | 20.00 |
| xylene | 20.00 |
| and (2) adding to the product of (a) (1) and then grinding for 16 hours: | |
| xylene | 56 |
| titanium dioxide pigment | 100 |
| silicone fluid (D.C.® 200, a polydimethyl siloxane having a viscosity at 25° C. of 1000 centistokes, sold by Dow Corning) | |
| (b) Adding to the mill base of (a), the following and mixing until dissolved: | |
| silicone resin flake (described in (1) ) | 455 |
| xylene | 455 |
| (c) Adding the following to the produce of (b) and then blending together: | |
| "Epon 828" (a liquid epoxy resin sold by Shell Chemical Company) | 25 |
| cobalt naphthenate | 7.05 |
| "Nuodex" (a zinc octoate solution, having 8% zinc metal content sold by Tenneco | 9.25 |
| V.M. and P. Naptha | 50 |
| | 1201.30 |

A tin plated steel muffin pan was wiped with xylene to remove any residue grease and then was grit blasted with 200 mesh grit at 80 pounds per square inch. The pan was then cleaned of grit particles with a blast of compressed air and was wiped with xylene.

The coating composition was then sprayed onto the pan to a film thickness of 0.7 mil (dry) and air dried for 10 minutes and then baked for 15 minutes at 215° C.

The resulting finish on the pan had a good glossy appearance, excellent adhesion to the metal substrate, a pencil hardness of F, and was fully cured as measured by a 50 double wipe test with toluene.

The coated pan was subjected to a 10 bake test at 220° C. with blueberry muffin mix and meat loaf mix. The release properties, ease of cleaning, and appearance of the finish remained excellent.

I claim:

1. A process of coating an article with a coating composition having a solids content of 25-80% by weight in an inert liquid carrier and comprised of
   (a) a binder comprised of
       (1) 60-90%, based on the weight of the binder, of a polysiloxane resin-forming precondensate which has one or more of the units

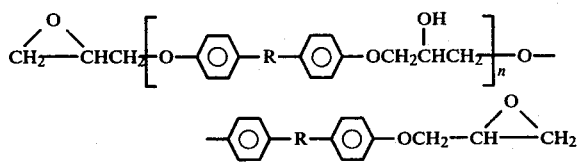

wherein

X is functional group which allows cross-linking at its site, and a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3, and which has a silanol content about 4%, based on the weight of the precondensate;

(2) 1-40%, based on the weight of the binder, of an epoxy resin having the formula

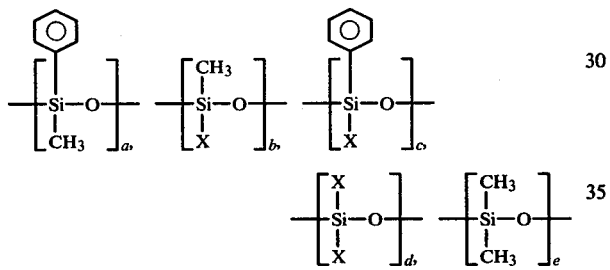

wherein n is an integer from 0-42, and

R is an alkylene group of 1-4 carbon atoms;

(b) 0.2-10%, based on the weight of the binder, of a silicone fluid which is dimethyl polysiloxane fluid having a viscosity of 50-5000 centistokes measured at 25° C.;

(c) 0.2-10%, based on the weight of the binder, of catalyst which is a metal salt; and (d) inert liquid carrier, wherein said coating composition is applied in an amount to give a dry coating thickness of 5-125 μm, and the coated article is baked for about 5-45 minutes at temperatures in the range of about 175°-232° C.

2. The process of claim 1 wherein the dry coating thickness is 12.5-37.5 μm.

3. The process of claim 1 wherein the baking is done at about 215° C.

* * * * *